United States Patent [19]

Buss et al.

[11] 4,012,313

[45] Mar. 15, 1977

[54] CATALYTIC REFORMING PROCESS AND CATALYST

[75] Inventors: Waldeen C. Buss, Richmond; Harris E. Kluksdahl, San Rafael, both of Calif.

[73] Assignee: Chevron Research Company, San Francisco, Calif.

[22] Filed: Sept. 12, 1975

[21] Appl. No.: 613,011

Related U.S. Application Data

[63] Continuation-in-part of Ser. No. 355,606, April 30, 1972, abandoned, which is a continuation-in-part of Ser. No. 301,696, Oct. 27, 1972, Pat. No. 3,852,190.

[52] U.S. Cl. .............................. 208/139; 252/441
[51] Int. Cl.$^2$ ...................................... C10G 35/08
[58] Field of Search ................... 208/139; 252/441

[56] References Cited

UNITED STATES PATENTS

| | | | |
|---|---|---|---|
| 2,479,110 | 8/1949 | Haensel | 252/441 |
| 2,606,878 | 8/1952 | Haensel | 208/139 |
| 2,840,532 | 6/1958 | Haensel | 252/442 |
| 3,058,907 | 10/1962 | Van Nostrand et al. | 208/139 |
| 3,147,229 | 9/1964 | Hinlicky et al. | 252/441 |
| 3,173,857 | 3/1965 | Haensel | 252/442 |
| 3,415,737 | 12/1968 | Kluksdahl | 208/139 |
| 3,759,841 | 9/1973 | Wilhelm | 208/139 |
| 3,816,300 | 6/1974 | Gallagher et al. | 208/139 |
| 3,852,217 | 12/1974 | Engelhard et al. | 208/139 |

*Primary Examiner*—Delbert E. Gantz
*Assistant Examiner*—James W. Hellwege
*Attorney, Agent, or Firm*—G. F. Magdeburger; R. H. Davies; W. D. Reese

[57] ABSTRACT

An improved reforming process is obtained using a catalyst containing platinum, rhenium and chloride disposed on a particulate support formed using alumina obtained by removing water from an aluminum hydroxide produced as a by-product of a Ziegler higher-alcohol synthesis, when the catalyst is prepared by calcining the alumina support at a temperature between 1000°–1500° F to provide a support having a surface area between 140–240 m$^2$/g, then impregnating a platinum compound and a rhenium compound into the calcined alumina in the presence of a sufficiently high concentration of chloride to obtain an impregnated composition, which, upon drying, contains at least 1.4 weight percent total chloride, and finally calcining the impregnated preparation to reduce the total chloride content of the final catalyst to less than 1.2 weight percent.

8 Claims, No Drawings

CATALYTIC REFORMING PROCESS AND CATALYST

CROSS-REFERENCE TO RELATED APPLICATIONS

This application is a continuation-in-part of our copending application Ser. No. 355,606, filed Apr. 30, 1972, now abandoned which is, in turn, a continuation-in-part of our application Ser. No. 301,696, filed Oct. 27, 1972, now U.S. Pat. No.

BACKGROUND OF THE INVENTION

The present invention concerns a reforming catalyst and a catalytic reforming process using the catalyst.

When petroleum hydrocarbon fractions in the gasoline boiling range are mixed with hydrogen and passed over a reforming catalyst such as a platinum-rhenium-alumina catalyst at conventional reforming conditions, the value of such hydrocarbons for use as fuel in automobile engines is improved.

One of the problems encountered in commercial reforming operations is fouling or coking of the catalyst. In order to maintain a steady rate of conversion in reforming, the temperature of operation must be increased more-or-less continuously as the fouling of the catalyst becomes progressively worse. Eventually, the reforming operation must be discontinued to replace or regenerate the catalyst. Shutting down such a refinery operation periodically is costly and tedious. It is, therefore, highly desirable to lower the fouling rate of a reforming catalyst to prolong its useful life.

Platinum-rhenium-alumina reforming catalysts are normally prepared by impregnating previously calcined alumina with a platinum compound and a rhenium compound. For example, a platinum-rhenium-alumina reforming catalyst may be prepared by commingling the alumina support with aqueous solutions of chloroplatinic acid and perrhenic acid. After the aqueous solutions of the metals are contacted with the alumina, the alumina is dried to remove the water, leaving the metal compounds deposited on the alumina. The alumina is then subjected to relatively low-temperature drying and subsequently is calcined or oxidized.

The halogen component has been added to catalysts in various ways, e.g., by addition of halogen in halogen compounds of metals during the metals-impregnation step. Total halogen content in reforming catalysts has been described in the range from 0.1 to 3.5 weight percent of the final catalyst. Calcination temperatures utilized to provide suitable alumina bases for catalysts have been taught between 850° F and 1300° F.

It has been taught in the art to add salts or acids to a chloroplatinic acid impregnating solution used with an alumina base or carrier, in order to distribute platinum on the carrier in a more efficient manner. The art teaches that a competitor adsorbate such as hydrochloric acid will effect a uniform distribution of platinum onto alumina. Competitor adsorbates which have been taught as useful in this regard include aluminum trinitrate, sodium nitrate, aluminum chloride and ammonium nitrate. Competitor adsorbates which have been taught as harmful in this same regard include nitric acid, hydrochloric acid, ammonium chloride and sulfuric acid. Such teaching as to competitor adsorbates may be found in "Industrial & Engineering Chemistry", Vol. 51, No. 8, and Vol. 49, No. 2.

SUMMARY OF THE INVENTION

According to the present invention, a process is provided for reforming a naphtha feedstock by contacting the feedstock at reforming conditions with a catalyst comprising platinum, rhenium, chloride and alumina wherein the catalyst is prepared by the following steps:

a. selecting an alumina support obtained by removing water from aluminum hydroxide produced as a by-product from a Ziegler higher-alcohol synthesis;

b. forming the alumina into an alumina catalyst support in particulate form;

c. calcining the support at a temperature between 1000° F and 1500° F until the surface area of the support is in the range from 140–240 m$^2$/g;

d. impregnating the resulting calcined support with a platinum compound and a rhenium compound in the presence of enough chloride so that the impregnated composition, after drying and before calcining, contains more than 1.4 weight percent total chloride;

e. driving the resulting impregnated composition to provide a dried composition containing the required more than 1.4 weight percent total chloride; and f. calcining the resulting impregnated and dried composition at a temperature in the range from about 500°–1200° F until the total chloride content of the composition is below about 1.2 weight percent.

Further in accordance with the present invention, a method is provided for preparing a reforming catalyst having 0.01–5 weight percent platinum and 0.01–5 weight percent rhenium disposed on an alumina support, which comprises the following steps:

a. selecting an alumina support obtained by removing water from aluminum hydroxide produced as a by-product from a Ziegler higher-alcohol synthesis;

b. forming the alumina into an alumina catalyst support in particulate form;

c. calcining the support at a temperature between about 1000° F and about 1500° F until the surface area of the support is in the range from 140–240 m$^2$/g;

d. impregnating the resulting calcined support with a platinum compound and a rhenium compound in the presence of enough chloride so that the impregnated composition, after drying and before calcining, contains more than 1.4 weight percent total chloride;

e. drying the resulting impregnated composition to provide a dried composition containing the required more than 1.4 weight percent total chloride; and f. calcining the resulting impregnated and dried composition at a temperature in the range 500° F to 1200° F until the total chloride content of the impregnated composition is between about 0.8 and 1.2 weight percent.

We have found that a surprising improvement in the performance, in a reforming process, of a platinum-rhenium catalyst utilizing as a carrier an alumina obtained from a Ziegler higher-alcohol synthesis may be accomplished by using a catalyst prepared by a sequence of steps which includes calcining in a particular manner an alumina support which is obtained by forming a particulate support from alumina recovered from a Ziegler alcohol synthesis reaction, then impregnating the support with platinum and rhenium compounds in the presence of sufficient chloride to provide greater than 1.4 weight percent total chloride in the dried catalyst preparation, and finally calcining the catalyst to reduce the total chloride content of the catalyst to between 0.8 and 1.2 weight percent.

DETAILED DESCRIPTION OF THE INVENTION

The aluminas used in preparing the catalyst of the present invention are obtained by removing water from aluminum hydroxide produced as a by-product from a Ziegler higher-alcohol synthesis reaction. Ziegler alcohol synthesis reactions are described, for example, in U.S. Pat. No. 2,892,858. The general method of synthesis is:

1. triethyl aluminum is prepared from aluminum, hydrogen and ethylene. This is carried out in two stages with recycle of two-thirds of the product, triethyl aluminum;
2. ethylene is added;
3. this product is oxidized to an aluminum alkoxide;
4. the alcohols are then formed by a hydrolysis step.

As pointed out in U.S. Pat. No. 2,892,858, alumina of high purity can be obtained by removal of water from the aluminum hydroxide paste obtained from the hydrolysis step (4). See our U.S. Pat. No. 3,852,190 for further details as to the preferred method for obtaining a high-surface-area alumina from a Ziegler higher-alcohol synthesis reaction.

Aluminas preferred for use are those which have an initial surface area greater than 240 m$^2$/g, and initial surface areas between about 250 and about 400 m$^2$/g are particularly preferred.

The alumina is first formed into an alumina catalyst support in any suitable, conventional manner. A catalyst support in particulate form may be formed, for example, by extrusion or conventional spherical particle formation techniques.

The alumina support in particulate form is calcined prior to its impregnation until the surface area of the support is between 140 and 240 m$^2$/g. Adjustment of the surface area of the support is achieved, at least in part, by calcining the support at a temperature between about 1000° F and 1500° F, preferably at a temperature between about 1150° F and about 1350° F. The high calcination temperatures employed in the preparation of the catalyst of this invention, as well as longer calcination times and the use of a moist calcination atmosphere, tend to reduce the surface area of the support to the desired level. In reducing the surface area of the support, it is particularly preferred to calcine the alumina support particles to provide a calcined support having a surface area between about 165 and 215 m$^2$/g.

The catalyst composition used in the present invention includes a platinum component which is preferably present in the finished catalyst in an amount between about 0.01 and about 5.0 weight percent, based upon the total weight of the finished catalyst. The catalyst of this invention also contains a rhenium component, which is preferably present in the finished catalyst in an amount between about 0.01 and about 5.0 weight percent, based on the total weight of the finished catalyst.

In providing the catalyst of this invention, the calcined alumina support is impregnated with a platinum compound and a rhenium compound in the presence of an excess amount of halide, preferably chloride. Various platinum compounds can be used, such as chloroplatinic acid, ammonium chloroplatinate, tetraammineplatinous nitrate, etc. Preferably a compound containing an anionic form of platinum is used. For example, chloroplatinic acid contains a anionic form of platinum, while tetraammine platinum contains a cationic form of platinum. Rhenium compounds which are suitable for incorporation onto the carrier include perrhenic acid, ammonium perrhenate or potassium perrhenate. Perrhenic acid is a preferred compound for impregnation of the rhenium component of the catalyst.

In forming the catalyst of the present invention, a sufficient amount of chloride is employed in the impregnation step so that the impregnated catalyst preparation contains more than 1.4 weight percent total chloride after drying of the impregnated composition. The amount of total chloride required is based on the weight of the dried composition after impregnation, that is, the weight of the impregnated catalyst which has been dried in a conventional manner, such as by heating it at a temperature of 150°–500° F for a suitable period, e.g., 300° F for one hour, of any equivalent, conventional drying known in the art. Preferably sufficient chloride is added to the composition in the metals impregnation step to provide a total chloride content of between 1.6 weight percent and 4 weight percent in the impregnated and dried preparation. A particularly preferred range of total chloride content is between about 1.6 and about 2.5 weight percent of the dried composition.

After the impregnated catalyst has been dried, the total chloride content of the catalyst is then decreased to between 0.8 weight percent and 1.2 weight percent to obtain the finished, calcined catalyst. Reduction of the chloride content of the final catalyst is performed by high-temperature calcination treatment, between 500° and 1200° F, and preferably between 800° and 1050° F. The high-temperature treatment to form the final catalyst preparation is preferably undertaken in the presence of air. A mixture of steam and air can also be used with good results. Preferably the final calcination of the platinum-, rhenium- and chloride-containing catalyst preparation is carried out to reduce the total chloride content of the catalyst preparation by at least 0.2 weight percent, and a reduction in the chloride content of the final catalyst of at least about 0.25 weight percent is particularly preferred.

In carrying out the reforming process of the present invention using the catalyst described above, any conventional naptha feedstock may be treated and any suitable conventional reforming reactor and unit may be utilized. Reforming conditions which are employed in the present process include a temperature of about 600° F to about 1100° F, and preferably between about 700° F and about 1050° F. A suitable liquid hourly space velocity is in the range from about 0.1 to about 10, and is preferably between about 1 and 5. The pressure used in the reforming process may be from about 25 psig to about 500 psig. The benefits of using the catalyst of the present invention, relative to previously employed reforming catalysts, include high liquid product yields that are obtainable at lower pressures, such as those between 100 psig and 250 psig. However, pressures between 100 psig and 500 psig are preferred for use in the present process.

EXAMPLES

EXAMPLE 1

Three catalysts, designated A-1, A-2 and A-3, were prepared according to the present invention. A first catalyst was prepared from an alumina support which has been produced by extrusion of catalyst particles from an alumina obtained as a by-product from a Ziegler higher-alcohol synthesis reaction. The support was calcined at a temperature of 1050° F for 2 hours. The surface area of the support was 220 m²/g. The calcined support was then impregnated with platinum, rhenium and chloride using a single aqueous solution containing chloroplatinic acid, perrhenic acid and hydrochloric acid. The impregnating solution was made up to give 1.7 weight percent total chloride. The impregnated catalyst was dried at 300° F. The dried preparation was then calcined at a temperature of 950° F, in moist air to enhance Cl removal, until the total chloride content had been reduced below 1.2 weight percent. The resulting catalyst was desginated Catalyst A-1. The composition of Catalyst A-1 was determined, and it was found to contain 0.3 weight percent platinum, 0.3 weight percent rhenium and 1.1 weight percent total chloride, the weight percents being based on the total weight of the final catalyst. A second catalyst was prepared according to the present invention in exactly the same manner as Catalyst A-1, except that, before impregnation of the alumina support, the support, which has been selected from the same alumina stock as that used to prepare Catalyst A-1 and extruded in an identical manner, was calcined at a temperature of 1250° F. The calcined support had a surface area of about 200 m²/g. The second preparation was then calcined in the same manner as Catalyst A-1 to reduce the chloride level, and was designated Catalyst A-2. The composition of Catalyst A-2 was determined, and it was found to contain 0.3 weight percent platinum, 0.3 weight percent rhenium, and 1.0 weight percent total chloride. A third catalyst was prepared according to the present invention in exactly the same manner as Catalyst A-1 and Catalyst A-2, except that, before impregnation of the extruded alumina support, which had been taken from the same stock used to prepare Catalysts A-1 and A-2, the support was calcined at a temperature of 1450° F. The calcined support had a surface area of about 186 m²/g. The third preparation was then calcined in the same manner used to calcine Catalysts A-1 and A-2 in order to reduce the chloride content, and the third preparation was then designated Catalyst A-3. The composition of Catalyst A-3 was determined, and it was found to contain 0.3 weight percent platinum, 0.3 weight percent rhenium, and 0.89 weight percent total choride.

EXAMPLE 2

Catalysts A-1 through A-3 were compared with several other catalysts which had not been prepared according to the present invention, but which had the same final compositions as Catalysts A-1 through A-3. For purposes of comparison with catalysts prepared according to the present invention, three catalysts with similar composition were prepared. A first comparison catalyst was prepared by selecting an alumina which had been produced as a by-product from a Ziegler higher-alcohol synthesis reaction and extruding the alumina to form a catalyst support in particulate form. The support was calcined at a temperature of 1050° F until the surface area of the support was 220 m²/g. The calcined support was then impregnated with platinum, rhenium and chloride using a single aqueous solution containing chloroplatinic acid, perrhenic acid and hydrochloric acid. The impregnating solution was made up to give 1.2 percent total chloride. The impregnated catalyst was dried at 300° F. The total chloride content of the preparation was below the total chloride range required for the preparation in catalysts prepared according to the present invention. The dried preparation was then calcined in dry air at about 900° F. The resulting catalyst was designated Catalyst B-1 for the purpose of comparing it with Catalysts A-1 through A-3. The composition of Catalyst B-1 was determined, and it was found to contain 0.3 weight percent platinum, 0.3 weight percent rhenium, and 1.1 weight percent total chloride. Thus, Catalyst B-1 had a final composition identical to that of Catalyst A-1, the only difference between Catalyst A-1 and Catalyst B-1 being their methods of preparation. A second catalyst was prepared in exactly the same manner as Catalyst B-1, except that, before impregnation, the extruded alumina support was calcined at a temperature of 1250° F. The second preparation was then calcined in exactly the same manner used to calcine Catalyst B-1, and the resulting catalyst was designated Catalyst B-2. Its composition was determined, and it was found to contain 0.3 weight percent platinum, 0.3 weight percent rhenium, and 1.0 weight percent total chloride. Thus, Catalyst B-2 had a final composition identical to that of Catalyst A-2, the only difference between them being their methods of preparation. A third catalyst was prepared in exactly the same manner as Catalysts B-1 and B-2, except that, before impregnation, the extruded alumina support was calcined at a temperature of 1450° F. The third preparation was then calcined in exactly the same manner as Catalysts B-1 and B-2, and the resulting composition was designated Catalyst B-3. The composition of Catalyst B-3 was determined, and it was found to contain 0.3 weight percent platinum, 0.3 weight percent rhenium, and 0.89 weight percent total chloride. Thus, Catalyst B-3 had a final composition identical to that of Catalyst A-3, the only difference between them being their methods of preparation. For purposes of comparison, a fourth catalyst was prepared in a different manner from Catalysts A-1 through A-3 and Catalysts B-1 through B-3. The catalyst was prepared by forming an alumina support by extruding an alumina obtained by removing water from aluminum hydroxide produced as a by-product from a Ziegler higher-alcohol synthesis reaction. The support was of the same material used to prepared Catalysts A-1 through A-3 and comparison Catalysts B-1 through B-3 and was formed into a particulate catalyst support in an identical manner. Prior to impregnation of the alumina support, the support was calcined at about 1250° F. After calcination, the support was impregnated with an aqueous solution of $Pt(NH_3)_4(NO_3)_2$ to give a catalyst precursor containing platinum deposited upon the support. The precursor was then dried at 300° F and impregnated with a solution containing hydrochloric acid and perrhenic acid. The resulting preparation was dried at 300° F. The dried preparation was then calcined at 950° F for 2 hours. The resulting catalyst was analyzed and found to contain about 0.3 weight percent platinum, about 0.3 weight percent rhenium, and 0.94 weight percent total chloride. This catalyst was designated Catalyst C. All of the catalysts prepared according to the invention (i.e., Catalysts A-1 through A-3) were compared with the other catalysts prepared by different methods yet having the same composition (i.e., Catalysts B-1 through B-3 and Catalyst C). The catalysts were all utilized, in turn, in the same reforming unit in an identical process. The feed was a conventional heavy naphtha. The temperature of the process was programmed to hold a constant product octane of 102 F-1 Clear. The pressure utilized was 80 psig, i.e., below the optimum pressure range for obtaining the relatively superior benefits of the catalysts of this invention (100-500 psig), in order to provide a high-severity operation for rapid determination of the fouling rates of all the catalysts. The hydrogen-to-naphtha ratio utilized was 3.8 mols hydrogen per mol of hydrocarbon. A liquid hourly space velocity of 3.0 was used. Each of the catalysts was utilized in a run having a length of about 15 to about 24 hours. The results of the runs using each of the catalysts are shown in Table I.

TABLE I

| Catalyst | Calcination Temp. (° F) | Free Cl After Pt Impregnation (wt. %) | Final Total Cl (wt. %) | Fouling Rate (° F/hour) |
|---|---|---|---|---|
| A-1 | 1050 | 1.4 | 1.1 | 2.8 |
| A-2 | 1250 | 1.4 | 1.0 | 2.2 |
| A-3 | 1450 | 1.4 | 0.89 | 2.8 |
| B-1 | 1050 | 0.9 | 1.1 | 3.4 |
| B-2 | 1250 | 0.9 | 1.0 | 3.1 |
| B-3 | 1450 | 0.9 | 0.9 | 3.1 |
| C | 1250 | — | 0.94 | 4.8 |

It is apparent from a comparison of the fouling rates of each of the catalysts in the reforming process described in Example 2, as shown in Table I, that the 3 catalysts prepared according to the present invention, i.e., Catalysts A-1, A-2 and A-3, were all superior to any of the other catalysts, including those which had exactly the same compositions. Thus, it is clearly demonstrated that catalysts prepared according to the method of the present invention provide superior results in the reforming of hydrocarbons.

What is claimed is:

1. A process for reforming a naphtha feedstock which comprises contacting said feedstock at reforming conditions with a catalyst comprising platinum, rhenium and chloride on an alumina support, said catalyst having been prepared by the steps of:
    a. selecting an alumina support obtained by removing water from aluminum hydroxide produced as a by-product from a Ziegler higher-alcohol synthesis;
    b. forming said alumina into an alumina catalyst support in particulate form;
    c. calcining said support at a temperature between 1000° F and 1500° F until the surface area of the support is in the range from 140 m²/g to 240 m²/g;
    d. impregnating the resulting calcined support with a platinum compound and a rhenium compound in the presence of enough chloride so that the impregnated composition, after drying and before calcining, contains more than 1.4 weight percent total chloride;
    e. drying the resulting impregnated composition to provide a dried composition containing said more than 1.4 weight percent total chloride; and
    f. calcining the resulting dried composition at a temperature between about 500° F and about 1200° F until the total chloride content of said composition is between about 0.8 and about 1.2 weight percent of the total weight of said catalyst.

2. A process in accordance with claim 1 wherein said alumina support has a surface area, prior to calcination, of greater than about 240 m²/g.

3. A process in accordance with claim 2 wherein said alumina support has a surface area, prior to calcination, of between about 250 and about 400 m²/g.

4. A process in accordance with claim 1 wherein said reforming conditions include a pressure of about 100 psig to about 500 psig.

5. A method for preparing a catalyst having 0.01 to 5 weight percent platinum and 0.01 to 5 weight percent rhenium disposed on an alumina support, which comprises the steps of:
    a. selecting an alumina support obtained by removing water from aluminum hydroxide produced as a by-product from a Ziegler higher-alcohol synthesis;
    b. forming said alumina into an alumina catalyst support in particulate form;
    c. calcining said support at a temperature between about 1000° F and about 1500° F until the surface area of said support is in the range from 140 m²/g to 240 m²/g;
    d. impregnating the resulting calcined support with a platinum compound and a rhenium compound in the presence of enough chloride so that the impregnated composition, after drying and before calcining, contains more than 1.4 weight percent total chloride;
    e. drying the resulting impregnated composition to provide a dried composition containing said more than 1.4 weight percent total chloride; and
    f. calcining the resulting dried composition at a temperature between about 500° F and about 1200° F until the total chloride content of said composition is between about 0.8 and about 1.2 weight percent of the total weight of said catalyst.

6. A method in accordance with claim 5 wherein said alumina support has a surface area, prior to calcination, of greater than about 240 m²/g.

7. A method in accordance with Claim 6 wherein said alumina support has a surface area, prior to calcination, of between about 250 and about 400 m²/g.

8. A method in accordance with claim 5 wherein said impregnated and dried composition has a total chloride content of at least about 1.6 weight percent and said catalyst has a total chloride content of less than about 1.1 weight percent.

* * * * *